(12) United States Patent
Andersson et al.

(10) Patent No.: US 11,496,549 B2
(45) Date of Patent: Nov. 8, 2022

(54) HETEROGENEOUS EXECUTION ENGINES IN A NETWORK CENTRIC PROCESS CONTROL SYSTEM

(71) Applicant: ABB Schweiz AG, Baden (CH)

(72) Inventors: Staffan Andersson, Lund (SE); Magnus Hammar, Limhamn (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/796,371

(22) Filed: Feb. 20, 2020

(65) Prior Publication Data

US 2020/0280603 A1    Sep. 3, 2020

(30) Foreign Application Priority Data

Mar. 1, 2019 (EP) ..................... 19160289

(51) Int. Cl.
*H04L 67/10* (2022.01)
*H04L 67/56* (2022.01)

(52) U.S. Cl.
CPC .............. *H04L 67/10* (2013.01); *H04L 67/56* (2022.05)

(58) Field of Classification Search
None
See application file for complete search history.

(56) References Cited

U.S. PATENT DOCUMENTS

2005/0278319 A1* 12/2005 Karklins ................ G05B 19/05
2007/0073850 A1*  3/2007 Callaghan .............. G05B 19/05
                                                                                709/220

(Continued)

OTHER PUBLICATIONS

Roberto Baldoni; et al: "Distributed Event Routing in Publish/Subscribe Communication Systems: a Survey", Jan. 1, 2006 (Jan. 1, 2006), XP055034894, Dipartimento di Informatica e Sistemistica, Università di Roma la Sapienza 27 pages.

(Continued)

*Primary Examiner* — Kevin T Bates
*Assistant Examiner* — Emad Siddiqi
(74) *Attorney, Agent, or Firm* — Whitmyer IP Group LLC

(57) ABSTRACT

A method for heterogeneous execution engines in a network centric process control system. The network centric process control system includes a plurality of nodes and each node includes one or more control service components, a middleware service component, a middleware API subcomponent, an address space subcomponent, and a communication component, where each control service component, middleware service component, and communication component is a separate executable running in a separate operating system process as provided by a real time operating system of each node. The method is performed by the network centric process control system, and includes identifying, by the communication component, a component of a node of the network centric process control system by an indication of a namespace ID of the component, forwarding, by the communication component, a request to the address space subcomponent of the identified component, wherein an item ID for runtime data of the identified component indicates an entity in the address space corresponding to the runtime data, and sending, by the communication component, an entity value, wherein the entity value corresponds to the requested runtime data. A network centric process control system, a computer program, and a computer program product for heterogeneous execution engines are also presented.

18 Claims, 6 Drawing Sheets

(56) References Cited

U.S. PATENT DOCUMENTS

| | | |
|---|---|---|
| 2011/0072441 A1 | 3/2011 | Parks et al. |
| 2014/0358812 A1* | 12/2014 | Hourte .................. H04W 4/029 |
| | | 705/325 |
| 2017/0116303 A1* | 4/2017 | Kolli ....................... G06F 16/28 |
| 2019/0004858 A1 | 1/2019 | Bernat et al. |

OTHER PUBLICATIONS

European Serach Report Application No. EP 19 16 0289 Completed: Aug. 1, 2019; dated Aug. 12, 2019 10 pages.
European Office Action; Application No. 19160289.5; dated May 31, 2022; 7 Pages.

* cited by examiner

HETEROGENEOUS EXECUTION ENGINES IN A NETWORK CENTRIC PROCESS CONTROL SYSTEM

TECHNICAL FIELD

The present disclosure relates to a method, a network centric process control system, a computer program, and a computer program product for heterogeneous execution.

BACKGROUND

Today's process controllers typically only execute control logic and control logic libraries developed for this specific controller type. Each controller type has a specific control engine for execution of its type of control logic.

Data exchange between controllers of different types, e.g. for access of IO data connected to another controller, requires engineering of a controller-to-controller communication. This is only possible if there is a communication protocol that is supported by both controllers. The setup of the controller-to-controller communication has a cost in terms of extra engineering effort.

SUMMARY

One objective is to enable reduced engineering efforts in process control systems.

According to a first aspect there is presented a method for heterogeneous execution engines in a network centric process control system. The network centric process control system comprises a plurality of nodes and each node comprises one or more control service components, a middleware service component, a middleware Application Programmer Interface (API) subcomponent, an address space subcomponent, and a communication component, where each control service component, middleware service component, and communication component is a separate executable running in a separate operating system process as provided by a real time operating system of each node. The method is performed by the network centric process control system, and comprises identifying, by the communication component, a component of a node of the network centric process control system by an indication of a namespace ID of the component, forwarding, by the communication component, a request to the address space subcomponent of the identified component, wherein an item ID for runtime data of the identified component indicates an entity in the address space corresponding to the runtime data, and sending, by the communication component, an entity value, wherein the entity value corresponds to the requested runtime data.

The method may further comprise receiving, by the communication component, a request for the runtime data of the component of the network centric process control system, wherein the request indicates the namespace ID of the component and the item ID for the runtime data.

The method may further comprise receiving, by the communication component, the entity value from the address space subcomponent, wherein the entity value corresponds to the requested runtime data.

The method may further comprise accessing, by the address space subcomponent, the entity value, and sending, by the address space subcomponent, the accessed entity value to the communication component. The entity value may be accessed by the address space subcomponent through the middleware API subcomponent or through the control service component.

The plurality of nodes may use the same communication protocol for vertical communication by the communication components thereof and for configuration of controllers, gateways and devices thereof.

The request for runtime data may be received from a vertical communication client of the network centric process control system, and the sending the received entity value is sent to the vertical communication client.

The communication component may in the first aspect be a vertical communication component.

According to a second aspect there is presented a network centric process control system for heterogeneous execution engines. The network centric process control system comprises a plurality of nodes and each node comprising one or more control service components, a middleware service component, a middleware API subcomponent, an address space subcomponent, and a communication component, where each control service component, middleware service component and communication component is a separate executable running in a separate operating system process as provided by a real time operating system of each node. Each component comprises a processor and a computer program product storing instructions that, when executed by the processor, causes the network centric process control system to identify, by the communication component, a component of a node of the network centric process control system by an indication of a namespace ID of the component, forward, by the communication component, a request to the address space subcomponent of the identified component, wherein an item ID for runtime data of the identified component indicates an entity in the address space corresponding to the runtime data, and to send, by the communication component, an entity value, wherein the entity value corresponds to the requested runtime data.

The network centric process control system may further be caused to receive, by the communication component, the request for runtime data of the component of the network centric process control system, wherein the request indicates the namespace ID of the component and the item ID for the runtime data.

The network centric process control system may further be caused to receive, by the communication component, an entity value from the address space subcomponent, wherein the entity value corresponds to the requested runtime data.

The network centric process control system may further be caused to access, by the address space subcomponent, the entity value, and to send, by the address space subcomponent, the accessed entity value to the communication component. The entity value may be accessed by the address space subcomponent through the middleware API component or through the control service component.

The plurality of nodes may use the same communication protocol for vertical communication by the communication components thereof and for configuration of controllers, gateways and devices thereof.

The request for runtime data may be received from a vertical communication client of the network centric process control system, and the sending the received entity value is sent to the vertical communication client.

The communication component may in the second aspect be a vertical communication component.

According to a third aspect there is presented a computer program for heterogeneous execution engines in a network centric process control system. The network centric process control system comprises a plurality of nodes and each node comprising one or more control service components, a middleware service component, a middleware API subcomponent, an address space subcomponent, and a communication component, where each control service component, middleware service component and communication component is a separate executable running in a separate operating system process as provided by a real time operating system of each node. The computer program comprises computer program code, which when run in a network centric process control system, causes the network centric process control system to identify, by the communication component, a component of a node of the network centric process control system by a namespace ID of the component, forward, by the communication component, a request to the address space subcomponent of the identified component, wherein an item ID for runtime data of the identified component indicates an entity in the address space corresponding to the runtime data, and to send, by the communication component, an entity value, wherein the entity value corresponds to the requested runtime data.

The communication component may in the third aspect be a vertical communication component.

A computer program product, comprising a computer program and a computer readable storage means on which the computer program is stored is also presented.

Advantages of heterogeneous execution engines in a network centric process control system is that heterogeneous execution engines enables existing control logic and control logic libraries developed for previous generations of controllers, or controllers from different vendors, to coexist with new control logic, and execute in the same controller. Control logic developed for different types of controllers can also exchange data without requiring engineering of controller-to-controller communication. Different types of control logic can be allocated in different controller, gateway and device nodes and use the same mechanism for exchange of data, i.e. through signals, as if they were allocated in the same controller node. Runtime data in different types of control logic can be accessed from operations in a similar way as runtime data in new control applications. Legacy controllers can be upgraded to new controllers based on modern hardware and take advantage of new features such as security, network centric communication architecture etc., while reusing existing control logic and control logic libraries developed for previous generations of controllers.

The advantages are possible since all controllers, gateways and devices have a middleware for signal exchange that makes it possible for any control service to access any signal in any other control service without knowledge of network layout, control service deployment, or control service internals. All control service components may have an address space subcomponent which makes it possible to map between any control service information model and the platform information model. Components that handle communication with other system parts, e.g. engineering, operations, and other controllers/gateways/devices, may handle mapping between platform information models and system communication information models.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The processing blocks of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
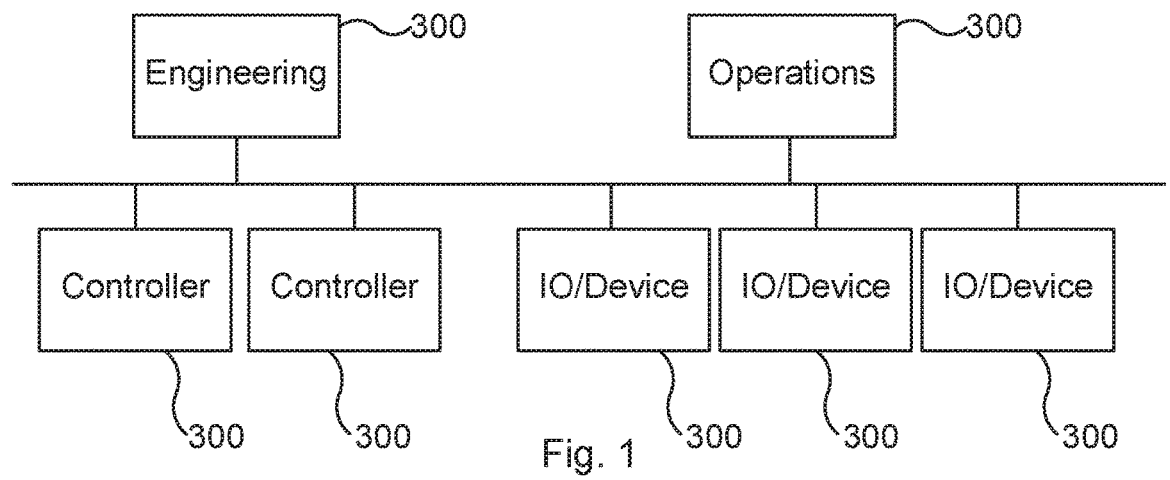
FIG. 1 schematically illustrates a network centric process control system architecture.

In a network centric process control system 100 architecture, illustrated in logical topology in FIG. 1, IO and devices 300 are not owned by a controller 300, as in a controller centric architecture. The engineering tool for IO and device configuration deploys configuration data to the IO and devices without involving a controller. Controllers are focused on execution of control logic and can access IO signals from any IO or device in the system. The network centric process control system architecture provides a system-wide easy access to IO and device information from upper system levels, such as operations and engineering, without any routing of information through the controller. The control logic doesn't have to be updated to access IO and device information.

A middleware service handles exchange of process data, represented as signals S, between control services, where the control services represent the principal services in controllers, gateways and devices, e.g. execution of control logic in a controller, scanning of IO and field devices in a fieldbus gateway, managing the device functionality in a device etc. The control services are typically allocated in different nodes, with one or more control services per node.

Generally speaking, a control service needing process data or runtime data for its operation, sometimes referred to as input process data or input runtime data, may be set to subscribe to the process data, which process data may comprise control signals, status data and/or process measurement values. A control service delivering process data, sometimes referred to as output process data or output runtime data, may in turn publish the process data, which may also comprise control signals, status data and/or process measurement values. The process data being published may be grouped in data sets. Each data set may additionally be assigned to a multicast address, e.g. IPV4 or IPV6. Binding of signal subscribers and signal publishers may be based on the Open Platform Communications Unified Architecture (OPC UA) standard of the OPC foundation, OPC UA PubSub with dynamic multicast filtering in the network and publish/subscribe to multicast addresses. The middleware service subscribes to data set multicast addresses on the network, and when the middleware service publishes a data set on one of these multicast addresses, the dynamic multicast filtering in the network ensures that this data set is distributed only to the nodes that have subscribed to this multicast address, e.g. by switches. Other protocols and mechanisms than OPC UA PubSub with dynamic multicast filtering may be used for the binding of publishers and subscribers, e.g. OPC UA client/server with additional discovery services.

It can thereby be seen that all the control services of a node are communicating with other control services via a middleware service of the node using publication of process data and subscription to process data. By using multicasting, the process data publishing and the subscribing are bound by multicast addresses.

Figure 2:
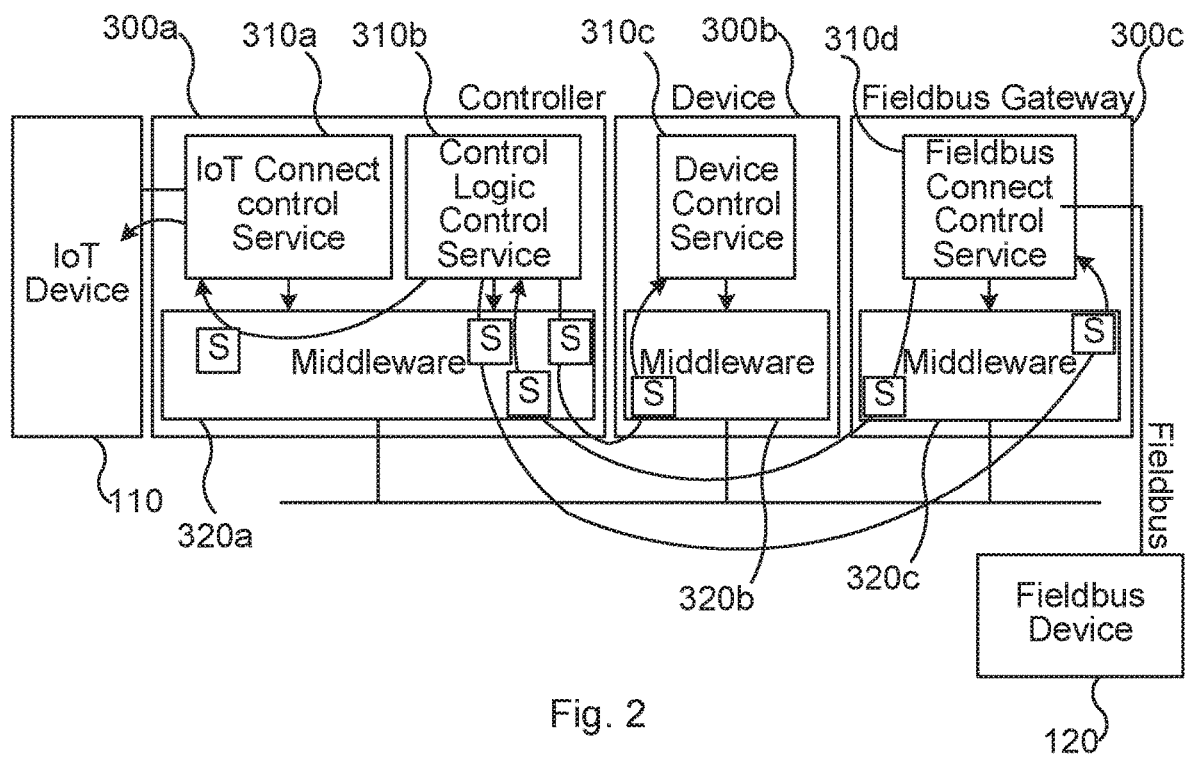
FIG. 2 schematically illustrates control services allocated to different nodes.

A control service has no knowledge about where other control services that the control service interacts with are allocated, since this is handled by the middleware service and is transparent to the control service. FIG. 2 shows an example with four control services 310a, 310b, 310c, and 310d executing in three nodes, a device 300b, a fieldbus gateway 300c and a controller 300a, where the controller 300a hosts two control services 310a and 310b. All three nodes have a middleware service 320a, 320b, and 320c, respectively, that handles the signal S exchange between the control services in the different nodes as well as between control services 310a and 310b allocated in the same node (i.e. in the controller 300a in this example). The middleware service is described here, whereas vertical communication is omitted here to focus on horizontal communication that is handled by the middleware service.

Interactions with controllers, devices etc. not using the middleware service, are handled by control services specific for the communication protocol needed for the interaction, as illustrated in FIG. 2. An IoT connect control service 310a connects to IoT devices 110 and a fieldbus connect control service 310c connects to fieldbus devices 120, e.g. Profibus devices. Such control services can execute in any node, e.g. in the controller node, as the IoT connect control service, or in a separate node, as the fieldbus connect control service.

The middleware and control services are built as separate executables or components, running in separate operating system processes, for memory protection and isolation of faults. A control service interacts with a middleware service through inter process communication.

Control services are configured by a set of engineering tools, one tool for each control service type, e.g. one engineering tool for control logic configuration and another tool for IO and device configuration. This gives an isolation of e.g. control logic engineering from IO engineering, i.e. control logic can be completely engineered without knowing where the control logic will be executed, or how/where the IO and devices are connected.

The middleware service is configured by a middleware configuration service in engineering, which uses signal definitions provided by the engineering tools to create the middleware configuration. The middleware configuration is sent with the control service configuration and forwarded to middleware service by the control services.

A signal S defines an interface between a publisher and a subscriber for the process data to be exchanged. A signal contains the following attributes:
system unique signal ID,
data type for the signal value, such as Boolean for digital signals or float for analogue signals, range and engineering unit for the signal value (for analogue signals only),
override value, used by the signal subscriber in case of bad signal quality, e.g. if the subscriber did not get any signals from the publisher, e.g. due to network error, and
substitute value, used by the signal publisher in case of bad signal quality, e.g. if an IO scanner has detected an error on an input channel on a fieldbus device.

Signals S are configured and connected to control logic variables and IO channels, in the engineering tools for control logic and IO engineering, and downloaded to the nodes. It is the responsibility of the middleware configuration service to guarantee that the signal IDs are unique within the system.

It is presented how it is possible for control logic and control logic libraries developed for different types of controllers to coexist in a network centric process control system of controllers, gateways and devices. The control logic can execute in the same node or in different controller, gateway and device nodes. The different types of control logic can exchange data without requiring engineering of a node-to-node communication.

Figure 3A:
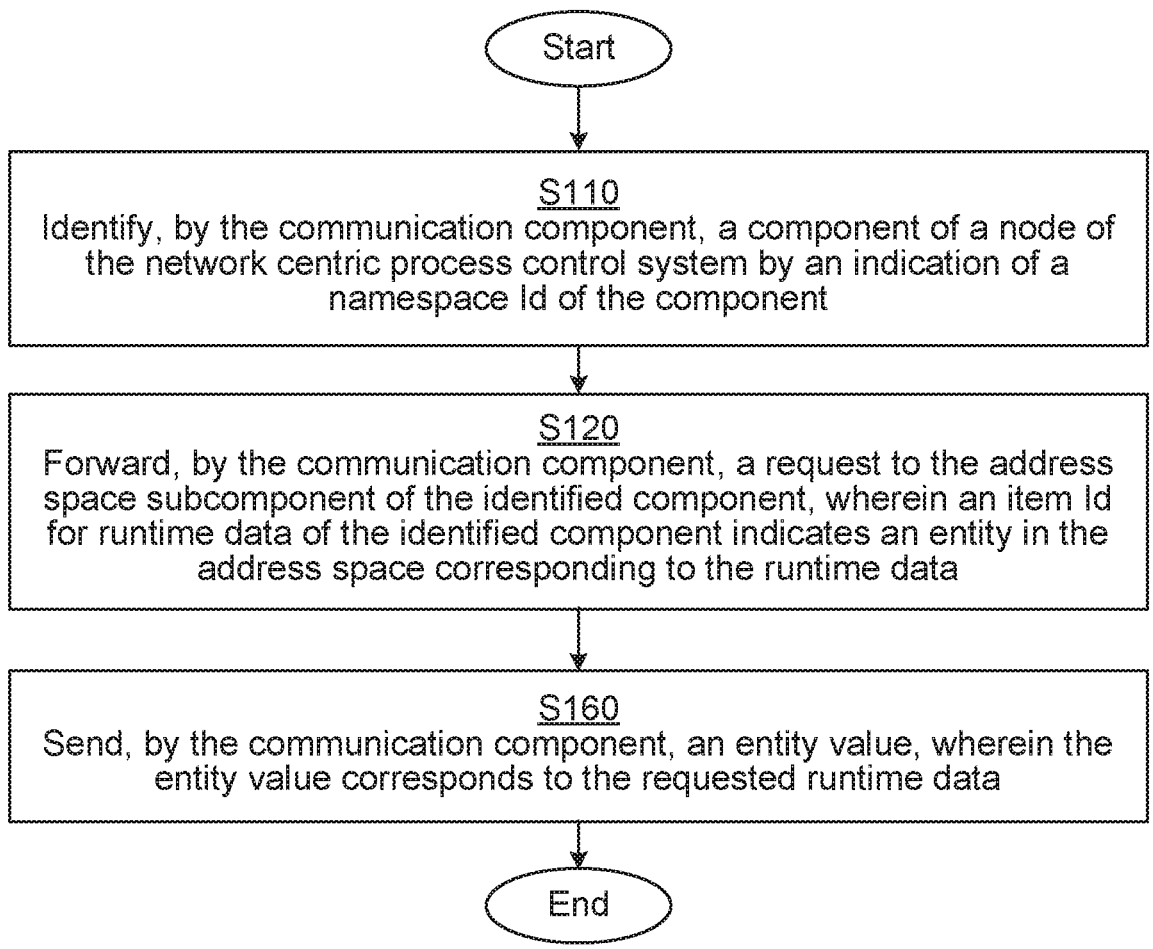
FIGS. 3A and 3B are flow charts illustrating methods for embodiments presented herein.

An embodiment for a method for heterogeneous execution engines in a network centric process control system is presented with reference to FIG. 3A. The network centric process control system 100 comprises a plurality of nodes 300a. Each node comprises one or more control service components 310a, a middleware service component 320a, a MW API subcomponent 340a, an address space subcomponent 350a, and a communication component 330a. Each control service component, middleware service component and communication component is a separate executable running in a separate operating system process as provided by a real time operating system of each node. In some aspects the method is performed by the network centric process control system. In processing block S110 the communication component identifies a component of a node of the network centric process control system by a namespace ID of the component. In processing block S120 the communication component forwards a request to the address space subcomponent of the identified component. An item ID for runtime data of the identified component indicates an entity in the address space corresponding to the runtime data. In processing block S160 the communication component sends an entity value. The entity value corresponds to the requested runtime data. The communication component may in this embodiment be a vertical communication component.

Figure 3B:
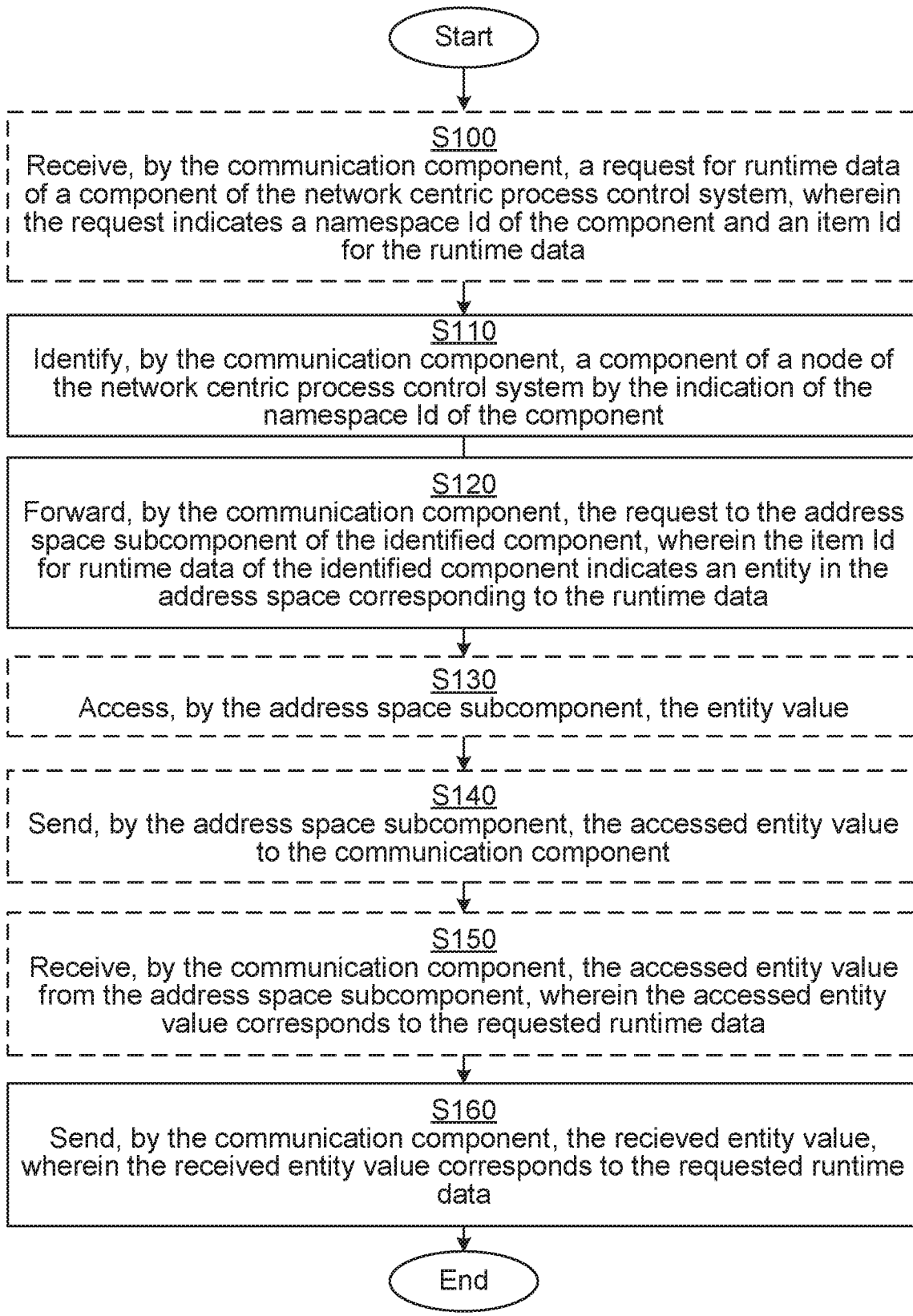

FIG. 3B is a flowchart illustrating further embodiments of methods for heterogeneous execution engines in a network centric process control system shown in FIG. 3A. In processing block S100 the communication component receives a request for runtime data of a component of the network centric process control system, as further described below and in greater detail in conjunction with the below figures. The request indicates a namespace ID of the component and an item ID for the runtime data. The communication component may in these further embodiments be a vertical communication component.

In processing block S150 the communication component receives an entity value from the address space subcomponent. The entity value corresponds to the requested runtime data.

In processing block S130 the address space subcomponent accesses the entity value. In processing block S140 the address space subcomponent sends the accessed entity value to the communication component.

The entity value may be accessed by the address space 350 through MW API 340 or through the control service component 310.

The plurality of nodes may use the same communication protocol for vertical communication by the communication components thereof and for configuration of controllers, gateways and devices thereof.

Processing block S100 may receive the request from a vertical communication client of the network centric process control system. Processing block S160 may send the received entity value to the vertical communication client.

The operations shown in FIGS. 3 A and 3B will now be illustrated and described in more detailed in conjunction with FIGS. 4-8 below.

Figure 4:
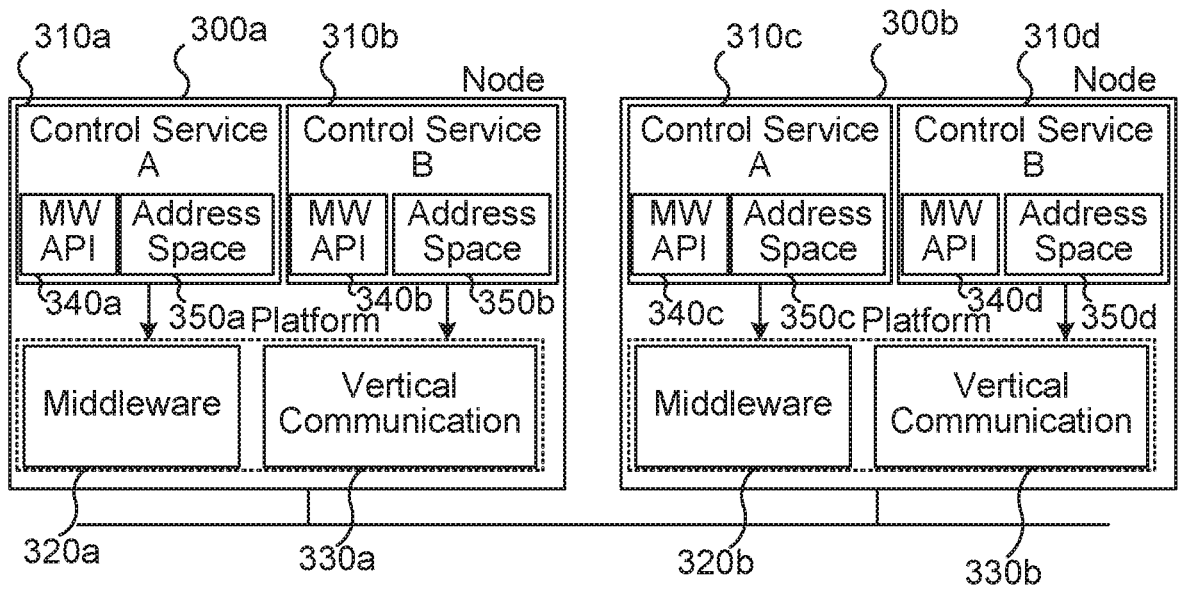
FIG. 4 schematically illustrates a node architecture for controllers, gateways and devices.

The component architecture for the controllers, gateways and devices in the process control system, in the following description called nodes, is illustrated in FIG. 4, wherein both horizontal and vertical communication is described.

Each node 300a and 300b has one or more control service components 310a, 310b, 310c, and 310d running on a platform with a middleware service component 320a or 320b and a vertical communication component 330a or 330b. Each middleware service component 320a or 320b handles the horizontal communication, i.e. signal exchange between controllers, gateways and devices. Each vertical communication component 330a or 330b handles the communication with other system parts, i.e. engineering and operations. Each middleware service component 320a and 320b, vertical communication component 330a and 330b, and control service component 310a, 310b, 310c and 310d are separate executables running in separate operating system processes provided by a real time operating system (not show in the figure).

To simplify the control service implementation and to harmonize the control services behavior, the platform may be provided with two subcomponents, middleware (MW) API 340a, 340b, 340c, and 340d, respectively, and address space 350a, 350b, 350c, and 350d, respectively, to be used in the control service interactions with the platform.

Each control service component has its own data base for runtime and configuration data, i.e. there is no separate component acting as a central data base used by all components. The control service runtime data base is optimized for the most frequent data accesses, e.g. for control logic execution and allows control services to have a specific information model, e.g. IEC 61131-3 information model with POUs, variables etc. Information not needed by others is hidden inside the control service, whereas information needed by others is represented as objects and variables in the address space subcomponent, according to a platform information model. In this respect, the database may be provided as anything that is configured to store data such as a traditional database, a class, a table, or any other type of suitable data structure.

The platform information model describes entities exposed by control services and used within a node as well as entities exposed outside of a node and used by other system parts, such as engineering and operations. Entities may also be used both internally and externally. All entities are exchanged through communication (inter process communication or network communication).

Example of entities that typically are exposed in address space are signals, conditions, function blocks, control logic variables, and control logic tasks.

Example of entities that typically aren't exposed in address space are control service internal entities such as control logic code blocks, and communication queues.

The address space subcomponent is populated by the control service, based on information downloaded from the corresponding engineering tool during configuration. The mapping between a control service information model and the platform information model is the responsibility of the control service implementation set during configuration thereof. The control service information model contains entities, where some of the entities are exposed to other components in address space such as function blocks and control logic variables, whereas other entities are not exposed to other components in address space such as control logic code blocks and communication queues (i.e. for internal use only).

The vertical communication service contains a communication stack for vertical communication and the middleware service contains a stack for horizontal communication. Preferably, both stacks are based on the same communication protocol, e.g. OPC UA, and the same information model, called the system communication information model in this description. The vertical communication and middleware services handle mapping between platform and system communication information models.

Figure 5:
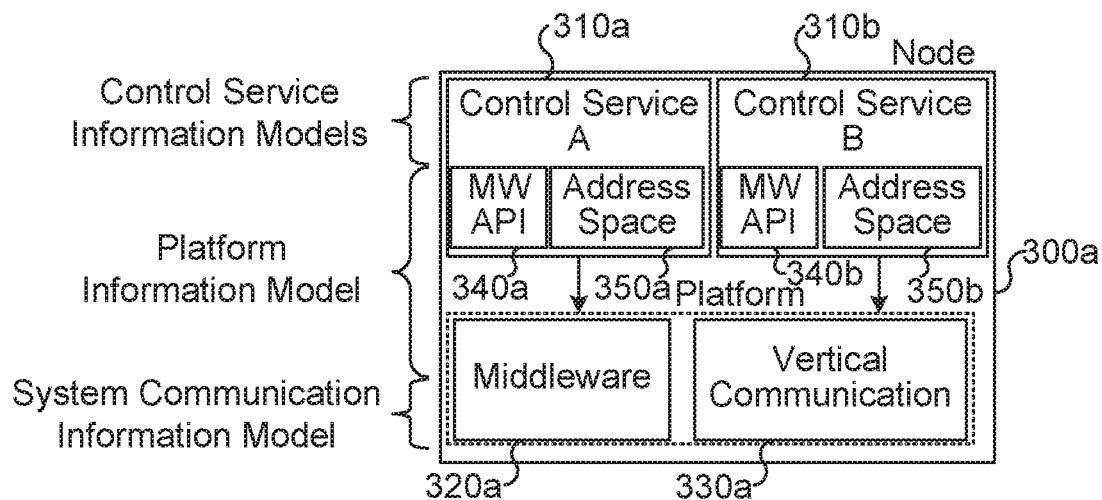
FIG. 5 schematically illustrates information modules in a node.

FIG. 5 shows an example with two different control services 310a and 310b in a node 300a, which e.g. could be a controller, gateway or device. The control services 310a and 310b have different control service information models and use the address space subcomponents 350a and 350b, respectively, to expose a selected set of objects and variables in the platform information model. Middleware service 320a, vertical communication 330a, and MW APIs 340a and 340b, correspond to those shown in FIG. 4.

The platform information model may use data types and mechanisms for identification of variables, objects, data types etc. that are close to the data types and identification mechanisms used by the system communication information model, which will simplify the mapping between the information models.

The node address space is divided into multiple namespaces: platform namespace, control service namespaces, and standard namespaces.

The platform namespace is for data types, variable types etc. defined by the platform information model.

The control service namespaces are for entities exposed by control services 310, with one namespace per control service type.

The standard namespaces are for data types, variables type etc. defined by standards, e.g. Open Platform Communications (OPC) Foundation, with one namespace per standard.

Entities are uniquely identified in address space by a namespace ID and an item ID. That is, the network centric process control system 100 is configured to perform processing block S100. The namespace ID identifies the namespace, and the item ID identifies an entity within a namespace.

Each namespace has a naming authority which is responsible for assigning unique identifiers for the namespace entities. The control service engineering tools are naming authorities for the control service namespaces. The engineering tool for an execution engine A is e.g. the naming authority for the execution engine A namespace. The developer for the platform is the naming authority for the platform namespace, and standards, such as OPC UA, is the naming authorities for standard namespaces.

Operations, engineering and similar vertical communication clients use the namespace ID and item ID for access of data in the node address space. IDs not known by a Vertical communication client can be retrieved through browsing in the node address space, or retrieved according to UPC UA node set file.

Each control service type is responsible for a specific namespace in the node. Execution engine A control service is e.g. responsible for the execution engine A namespace.

Vertical communication has knowledge, from configuration, about the namespace responsibilities and uses that to identify in which component of its node to find a specific entity requested by a client, i.e. vertical communication client. The network centric process control system may apply the knowledge to perform processing block S100. In case a node has two control services of the same type, the vertical communication service will query both control services. Data types, variable types etc. defined by the platform and standard namespaces, are known by all components in the node through configuration.

Figure 6:
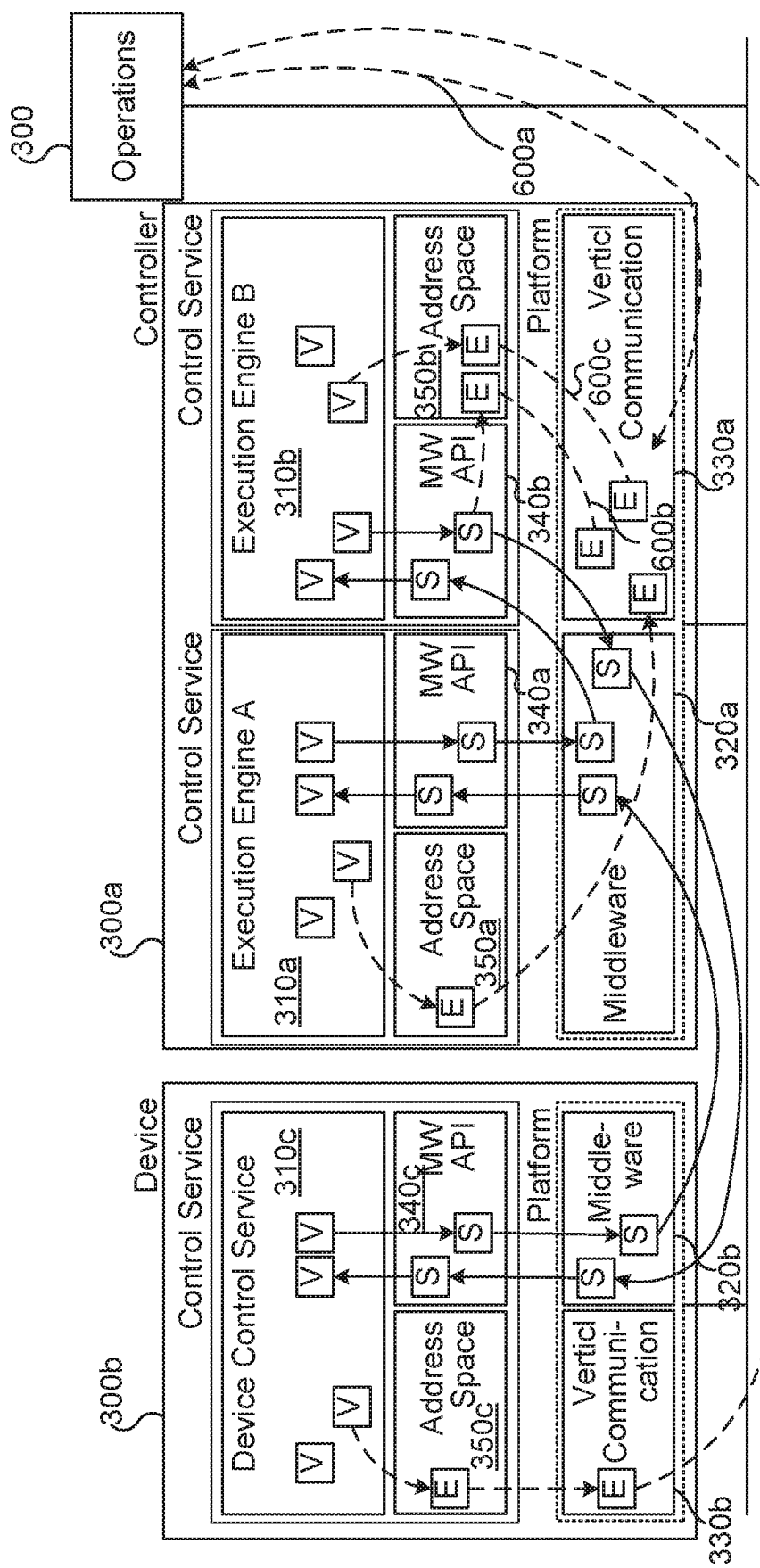
FIG. 6 schematically illustrates an example with two different execution engines.

FIG. 6 shows an example with a device node 300b, a controller node 300a, and node 300 acting as a vertical communication client. Vertical communication is illustrated with dashed arrows, and horizontal communication is illustrated with straight arrows. The controller node 300a has two execution engine control services 310a and 310b of different types, A and B, with different control service information models. The execution engine A may e.g. have control service information model where all control logic variables are represented as 4-byte values plus a time stamp plus quality information. The execution engine B may e.g. have control service information model where different types of control logic variables are represented with different number of bytes and without time stamp and quality information. The execution engines 310a and 310b exchange data through signals S via the middleware service 320a, and access input and output signals S in a shared device 300b, via the middleware service 320b. Control logic variables values V in the execution engines 310a and 310b are copied to/from signals S in the middleware (MW) API 340a and 340b, respectively. This includes conversions/mapping between the control engine format, according to a control service information model, and a unified signal format, according to the platform information model.

Two control logic variables V and one signal S are exposed E in the controller address spaces 350a and 350b. A device variable V is exposed E in the device address space 350c. When the vertical communication service 330a in the controller 300a receives a read request from a client 300, i.e. operations here, as shown symbolically by arrow 600a, the vertical communication service 330a uses the namespace ID (provided by the client) to identify in which component of its node to find a value (of an item ID provided by the client). The network centric process control system 100 may apply the provided namespace ID to perform processing block S110. The network centric process control system may be configured to receive the request to perform processing block S100. The address space 350a and 350b in the requested control service uses the item ID of the request to find the corresponding entity in address space 350a and 350b, by forwarding the request thereto. That is, the network centric process control system 100 is configured to perform processing block S120. The entity contains information about access rights and data type and has a reference for access of the entity value. The entity value may e.g. be accessed by the address space through MW API 340a or 340b, or through the execution engine 310a or 310b, depending on the type of entity. Signals S are accessed in MW API 340a or 340b and control logic variables are accessed in the execution engine 310a or 310b. The network centric process control system 100 may be configured to access the entity value to perform processing block S130. The reference is defined during configuration of the address space subcomponent. The entity value is returned according to the platform data formats (defined by the platform information model), and the address space subcomponent sends the value to the vertical communication service as shown symbolically by arrows 600b and 600c, which packages the variable value according the system information model in the response back to operations. The network centric process control system may be configured to send the value from the address space subcomponent to the vertical communication to perform processing block S140. The network centric process control system may be configured to receive the value in the vertical communication to perform processing block S150. The value is then sent back to the client as shown symbolically by arrow 600a. The network centric process control system 100 send the value back in processing block S160. Vertical communication 330b, MW API 340c, and address space 350c, correspond to those shown in FIG. 4.

A read request has been provided as an example for heterogeneous execution engines in the network centric process control system. The read request is a single operation. Similarly, a write request could be requested, for a single operation. However, a subscribe read request, providing response messages e.g. ones per second from a single request is also possible.

A control service has no knowledge about where its control service communication partners are allocated, since this is handled through by the middleware services. Therefore, the two execution engine control services A and B can be deployed in the same controller as shown in the example, or in different controller, gateway and device nodes. In both cases, the execution engine control services can exchange data through signals and access any signal in any device or gateway, and vertical communication clients can access any control logic variable that is exposed in an address space.

Figure 7:
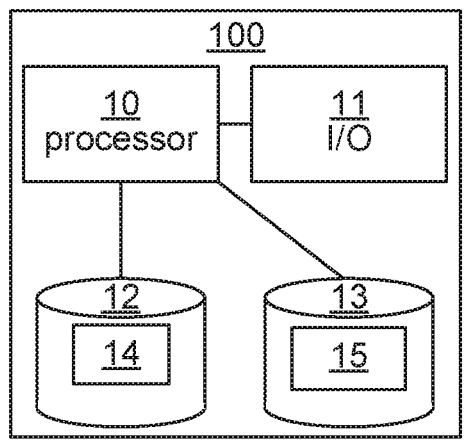
FIG. 7 is a schematic diagram illustrating some components of devices presented herein.

An embodiment of a network centric process control system for heterogeneous execution engines in a network centric process control system is presented with reference to FIG. 7. The network centric process control system 100 comprises a plurality of nodes 300a. Each node comprises one or more control service components 310a, a middleware service component 320a, a MW API subcomponent 340a, an address space subcomponent 350a, and a communication component 330a. Each control service component, middleware service component and communication component is a separate executable running in a separate operating system process as provided by a real time operating system of each node. Each component comprises a processor 10 and a computer program product 12, 13 storing instructions that, when executed by the processor, causes the network centric process control system to identify, by the communication component, a component of a node of the network centric process control system by an indication of a namespace ID of the component, forward, by the communication component, a request to the address space subcomponent of the identified component, wherein an item ID for runtime data of the identified component indicates an entity in the address space corresponding to the runtime data, and to send, by the communication component, an entity value, wherein the entity value corresponds to the requested runtime data. The communication component may in this embodiment be a vertical communication component.

The network centric process control system may further be caused to receive, by the communication component, the request for runtime data of the component of the network centric process control system, wherein the request indicates the namespace ID of the component and the item ID for the runtime data.

The network centric process control system may further be caused to receive, by the communication component, an entity value from the address space subcomponent, wherein the entity value corresponds to the requested runtime data.

The network centric process control system may further be caused to access, by the address space subcomponent, the entity value, and to send, by the address space subcomponent, the accessed entity value to the communication component.

The entity value may be accessed by the address space subcomponent 350a through the MW API subcomponent 340 or through the control service component 310a.

The plurality of nodes may use the same communication protocol for vertical communication by the communication components thereof and for configuration of controllers, gateways and devices thereof.

The request for runtime data may be received from a vertical communication client of the network centric process control system, and the sending the received entity value may be sent to the vertical communication client.

FIG. 7 is a schematic diagram showing some components of the network centric process control system 100. The processor or processing circuitry 10 may be provided using any combination of one or more of a suitable central processing unit(CPU), multiprocessing circuitry, microcontroller, digital signal processing circuitry(DSP), application specific integrated circuit etc., capable of executing software instructions of a computer program 14 stored in a memory. The memory can thus be considered to be or form part of the computer program product 12. The processing circuitry 10 may be configured to execute methods described herein with reference to FIGS. 3A-3B.

The memory may be any combination of read and write memory (RAM), and read only memory (ROM). The memory may also comprise persistent storage, which, for example, can be any single one or combination of magnetic memory, optical memory, solid state memory or even remotely mounted memory.

A second computer program product 13 in the form of a data memory may also be provided, e.g. for reading and/or storing data during execution of software instructions in the processing circuitry 10. The data memory can be any combination of read and write memory (RAM), and read only memory (ROM), and may also comprise persistent storage, which, for example, can be any single one or combination of magnetic memory, optical memory, solid state memory or even remotely mounted memory. The data memory may e.g. hold other software instructions 15, to improve functionality for the network centric process control system.

The node manager may further comprise an input/output (I/O) interface 11 including e.g. a user interface. The network centric process control system may further comprise a receiver configured to receive signaling from other nodes, and a transmitter configured to transmit signaling to other nodes (not illustrated). Other components of the network centric process control system are omitted in order not to obscure the concepts presented herein.

An embodiment of a computer program for a heterogeneous execution engine in a network centric process control system 100 is presented with reference to FIG. 7. The network centric process control system comprises a plurality of nodes 300a and each node comprises one or more control service components 310a, a middleware service component 320a, a MW API subcomponent 340a, an address space subcomponent 350a, and a communication component 330a, where each control service component, middleware service component and communication component is a separate executable running in a separate operating system process as provided by a real time operating system of each node. The computer program comprises computer program code, which when run in a network centric process control system, causes the network centric process control system to identify, by the communication component, a component of a node of the network centric process control system by a namespace ID of the component, forward, by the communication component, a request to the address space subcomponent of the identified component, wherein an item ID for runtime data of the identified component indicates an entity in the address space corresponding to the runtime data, and send, by the communication component, an entity value, wherein the entity value corresponds to the requested runtime data. The communication component may in this embodiment be a vertical communication component.

A computer program product 12, 13, comprising a computer program 14, 15 and a computer readable storage means on which the computer program 14, 15 is stored is also presented.

Figure 8:
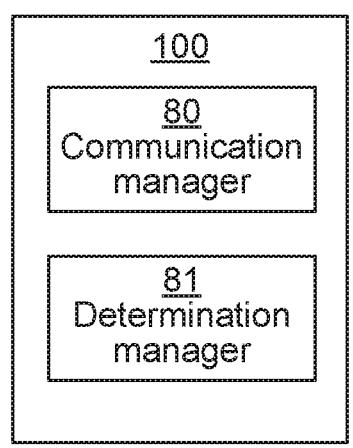
FIG. 8 is a schematic diagram illustrating functional modules of devices presented herein.

A network centric process control system for heterogeneous execution engines thereof is presented with reference to FIG. 8. The network centric process control system 100 comprises a communication manager 80 for receiving S100, by the communication component, a request for runtime data of a component of a node of the network centric process control system, wherein the request indicates a namespace ID of the component and an item ID for the runtime data, forwarding S120, by the communication component, the request to the address space subcomponent of the identified component, wherein the item ID indicates an entity in the address space corresponding to the runtime data, receiving S150, by the communication component, an entity value from the address space subcomponent, wherein the entity value corresponds to the requested runtime data, and for sending S160, by the communication component, the received entity value, and a determination manager 81 for identifying S110, by the communication component, the component by the namespace ID. The communication component may in this system be a vertical communication component.

FIG. 8 is a schematic diagram showing functional blocks of the network centric process control system 100. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the processing blocks in the method illustrated in FIGS. 3A-3B, comprising a communication manager unit 80 and a determination manger unit 81. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The communication manager 80 is for heterogeneous execution engines in a network centric process control system 100. This module corresponds to processing blocks S100, S120, S130, 140, 150 and S160 of FIGS. 3A-3B. This module can e.g. be implemented by the processing circuitry 10 of FIG. 7, when running the computer program.

The determination manger 81 may be used for heterogeneous execution engines in the network centric process control system 100. This module corresponds to processing blocks S110 of FIGS. 3A-3B. This module can e.g. be implemented by the processing circuitry 10 of FIG. 7, when running the computer program.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

The invention claimed is:

1. A method for heterogeneous execution engines in a network centric process control system, the network centric process control system comprising a plurality of nodes including a controller node, each node including a control service component, a middleware service component, a middleware Application Programmer Interface (API) subcomponent, an address space subcomponent, and a communication component, wherein each control service component, middleware service component, and communication component is a separate executable running in a separate operating system process as provided by a real time operating system of each node, the method being performed by the controller node of the network centric process control system, the method including the steps:
identifying, by the communication component of the controller node, the control service component of the controller node by an indication of a namespace ID of the component in an address space of the controller node;
forwarding, by the communication component of the controller node, a request to the address space subcomponent of the identified component using the namespace ID and an item ID, wherein the item ID is an item ID for runtime data of the identified component and indicates an entity in the address space corresponding to the runtime data, the runtime data being control signals and/or process measurement values; and
sending, by the communication component of the controller node, an entity value of the entity, wherein the entity value corresponds to the requested runtime data;
wherein the control service component of the controller node executes control logic.

2. The method according to claim 1, further comprising:
receiving, by the communication component, the request for the runtime data of the identified component, wherein the request indicates the namespace ID of the identified component and the item ID for the runtime data.

3. The method according to claim 2, further comprising:
receiving, by the communication component, the entity value from the address space subcomponent, wherein the entity value corresponds to the requested runtime data.

4. The method according to claim 2, further comprising:
accessing, by the address space subcomponent, the entity value; and
sending, by the address space subcomponent, the accessed entity value to the communication component.

5. The method according to claim 2, wherein the plurality of nodes use the same communication protocol for vertical communication by the communication components thereof and for configuration of controllers, gateways and devices thereof.

6. The method according to claim 2, wherein the request for runtime data is received from a vertical communication client of the network centric process control system, and the sending the received entity value is sent to the vertical communication client.

7. The method according to claim 1, further comprising:
receiving, by the communication component, the entity value from the address space subcomponent, wherein the entity value corresponds to the requested runtime data.

8. The method according to claim 1, further comprising:
accessing, by the address space subcomponent, the entity value; and
sending, by the address space subcomponent, the accessed entity value to the communication component.

9. The method according to claim 8, wherein the entity value is accessed by the address space subcomponent through the middleware API subcomponent or through the control service component.

10. The method according to claim 1, wherein the plurality of nodes use the same communication protocol for vertical communication by the communication components thereof and for configuration of controllers, gateways and devices thereof.

11. The method according to claim 1, wherein the request for runtime data is received from a vertical communication client of the network centric process control system, and the sending the received entity value is sent to the vertical communication client.

12. A network centric process control system for heterogeneous execution engines, the network centric process control system comprising a plurality of nodes including a controller node, each node including a control service component, a middleware service component, a middleware API subcomponent, an address space subcomponent, and a communication component, wherein each control service component, middleware service component, and communication component is a separate executable running in a separate operating system process as provided by a real time operating system of each node, each component including:
a processor; and
a computer program product storing instructions that are executable by the processor, wherein the instructions of the controller node causes the controller node to:
identify, by the communication component of the controller node, the control service component of the controller node by an indication of a namespace ID of the component in an address space of the controller node;
forward, by the communication component of the controller node, a request to the address space subcomponent of the identified component using the namespace ID and an item ID, wherein the item ID is an item ID for runtime data of the identified component and indicates an entity in the address space corresponding to the runtime data, the runtime data being control signals and/or process measurement values; and send, by the communication component of the controller node, an entity value of the entity, wherein the entity value corresponds to the requested runtime data;

wherein the control service component of the controller node executes control logic.

13. The network centric process control system according to claim 12, further caused to:

receive, by the communication component, the request for runtime data of the identified component, wherein the request indicates the namespace ID of the identified component and the item ID for the runtime data; and receive, by the communication component, an entity value from the address space subcomponent, wherein the entity value corresponds to the requested runtime data.

14. The network centric process control system according to claim 12, further caused to:

access, by the address space subcomponent, the entity value; and send, by the address space subcomponent, the accessed entity value to the communication component.

15. The network centric process control system according to claim 14, wherein the entity value is accessed by the address space subcomponent through the middleware API subcomponent or through the control service component.

16. The network centric process control system according to claim 12, wherein the plurality of nodes use the same communication protocol for vertical communication by the communication components thereof and for configuration of controllers, gateways and devices thereof.

17. The network centric process control system according to claim 12, wherein the request for runtime data is received from a vertical communication client of the network centric process control system, and the sending the received entity value is sent to the vertical communication client.

18. A computer program product for heterogeneous execution engines in a network centric process control system, the network centric process control system having a plurality of nodes including a controller node, each node including a control service component, a middleware service component, a middleware API subcomponent, an address space subcomponent, and a communication component, wherein each control service component, middleware service component, and communication component is a separate executable running in a separate operating system process as provided by a real time operating system of each node, the computer program product comprising:

a non-transitory computer-readable storage medium; and a computer program code stored on the non-transitory computer-readable storage medium and being configured to, when run in the controller node of the network centric process control system, cause the controller node to execute a method, the method including:

identifying, by the communication component of the controller node, the control service component of the controller node by an indication of a namespace ID of the component in an address space of the controller node;

forwarding, by the communication component of the controller node, a request to the address space subcomponent of the identified component using the namespace ID and an item ID, wherein the item ID is an item ID for runtime data of the identified component and indicates an entity in the address space corresponding to the runtime data, the runtime data being control signals and/or process measurement values; and sending, by the communication component of the controller node, an entity value of the entity, wherein the entity value corresponds to the requested runtime data;

wherein the control service component of the controller node executes control logic.

* * * * *